Dec. 29, 1925.
C. M. BONNEY
1,567,784
LAND CLEARING MACHINE
Original Filed Oct. 2, 1922   2 Sheets-Sheet 1
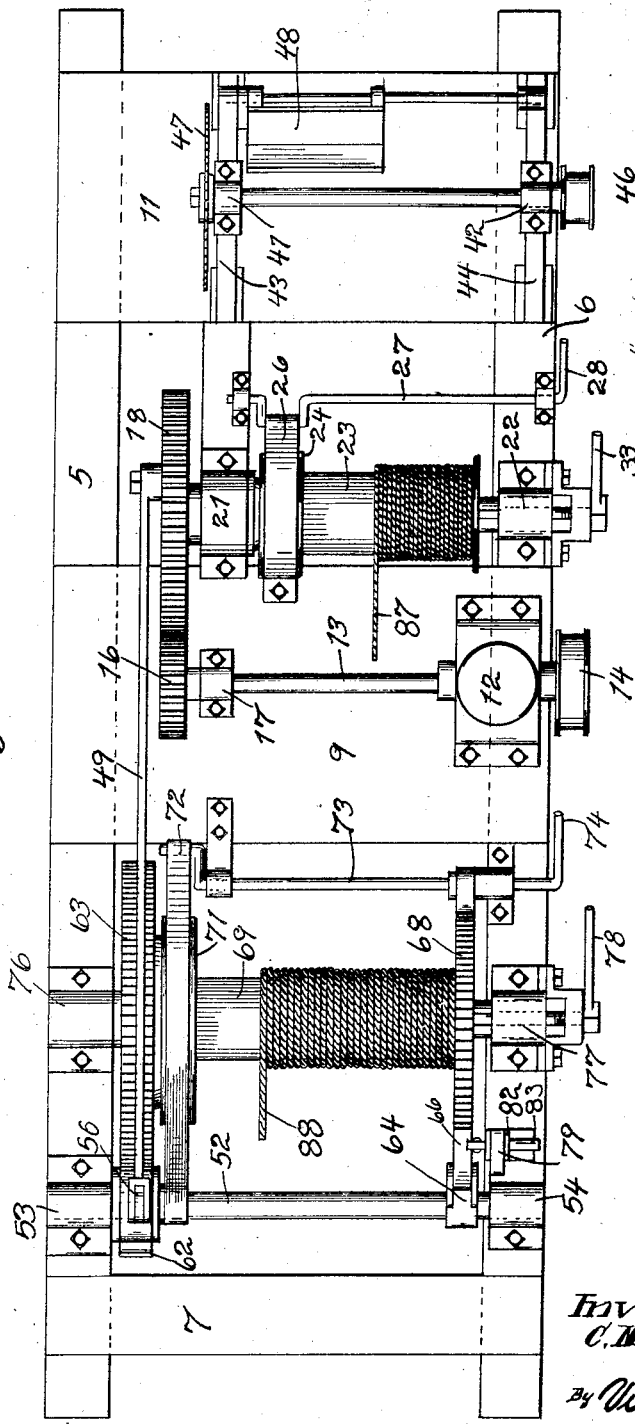
Inventor.
C. M. Bonney
By Victor J. Evans
Attorney.

Dec. 29, 1925.
C. M. BONNEY
1,567,784
LAND CLEARING MACHINE
Original Filed Oct. 2, 1922   2 Sheets-Sheet 2
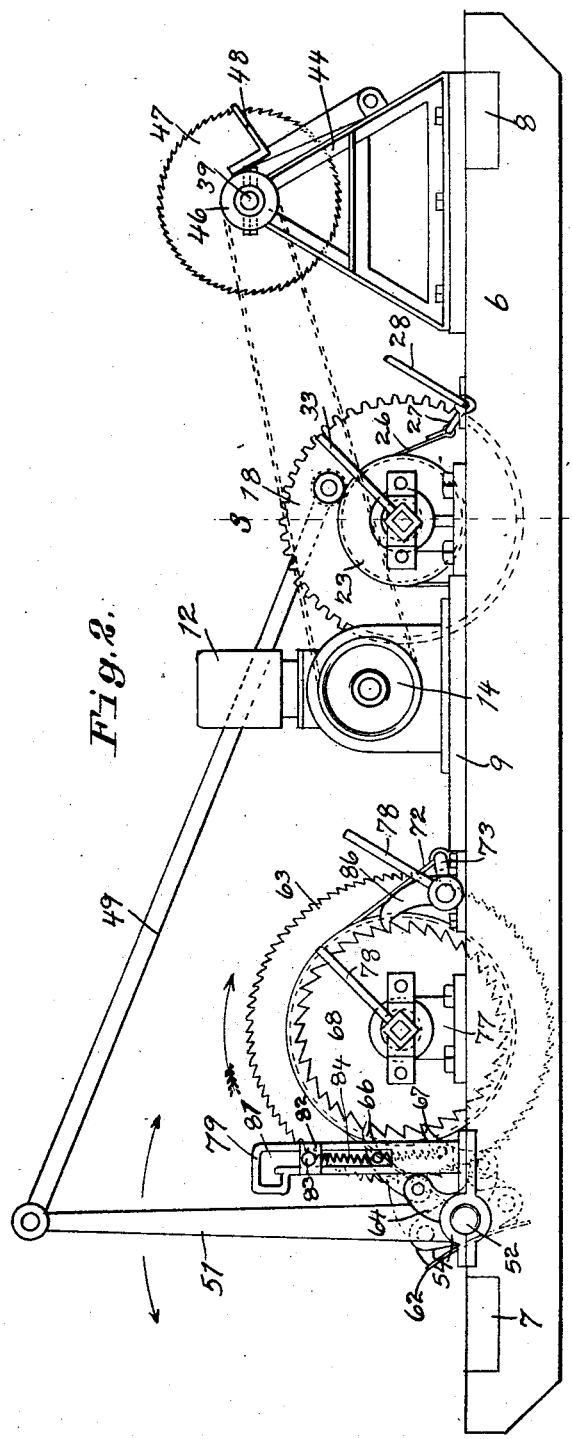
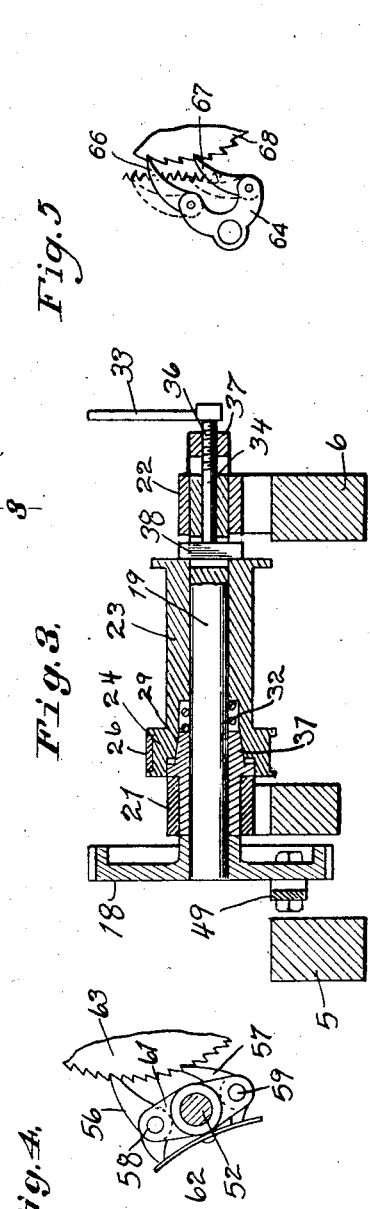
Inventor.
C. M. Bonney.
By Victor J. Evans.
Attorney Patented Dec. 29, 1925.

1,567,784

UNITED STATES PATENT OFFICE.

CHARLES M. BONNEY, OF HOQUIAM, WASHINGTON.

LAND-CLEARING MACHINE.

Application filed October 2, 1922, Serial No. 591,886. Renewed June 2, 1925.

*To all whom it may concern:*

Be it known that I, CHARLES M. BONNEY, a citizen of the United States, residing at Hoquiam, in the county of Grays Harbor and State of Washington, have invented new and useful Improvements in Land-Clearing Machines, of which the following is a specification.

This invention relates to improvements in land clearing machines, the principal object of which is to provide a simple yet powerful puller, and one which is cheap to construct.

Another object is to provide means whereby high speed work may also be accomplished.

A further object is to provide a machine of this type which may be transported from place to place, as a unit, and one which will have a series of uses, such as sawing wood, operating hay hoists, pulling hay forks, and the like.

Other objects and advantages will be apparent during the course of the following description.

In the accompanying drawings forming a part of this specification, and in which like numerals are employed to designate like parts throughout the same, Figure 1 is a top plan view of my device,
Figure 2 is a side elevation of Figure 1,
Figure 3 is a cross-section taken on the line 3—3 of Figure 2, and
Figure 4 is a fragmentary detail view of the low speed ratchet.
Figure 5 is a fragmentary detail view of the high speed ratchet.

In the clearing of land, it is often necessary to remove obstacles, such as trees, roots of trees, boulders and the like which are heavy and slow moving objects, while in other instances it is necessary to remove piles of brush which may be quickly transported, and it is to provide a device capable of such use that I have produced my land clearing machine, wherein the numerals 5 and 6 refer to skids common to devices of this character. These skids are secured one to the other as by cross-braces 7 and 8 and also by bridge-pieces indicated by the numerals 9 and 11.

Supported upon the bridge piece 9 is an engine indicated by the numeral 12. This engine is provided with the usual shaft 13 having a pulley 14 upon one end thereof and a gear 16 upon its opposite end. A bearing 17 is provided for supporting the free end of the shaft 13 at a point adjacent the gear 16. This gear is in constant mesh with a gear 18 mounted upon a shaft 19, which shaft is journaled in bearings 21 and 22 and carries thereon a drum 23. This drum is formed integral with a brake drum 24 against which a brake band 26 contacts. This brake band is operated through the medium of a crank rod 27 operated by a handle 28. In order to connect the drum 23 to the shaft 19, I provide the same with a female recess 29 adapted to receive a male projection 31 which is secured to the shaft in any well known manner. A spring 32 serves to keep the respective parts of the clutch thus formed by the male and female portions apart except when the lever 33 is thrown so as to push the drum 23 inwardly. This is accomplished through the rod 34 having screw engagement 36 with a yoke 37, with the result that as the lever 33 is rotated, the block 38 pushes the drum 23 inwardly.

At 39, I have shown a shaft journaled as at 41 and 42 upon the bridge piece 11, suitable supports being provided as shown at 43 and 44. This shaft 39 carries a pulley 46 at one end which is in line with the pulley 14 and is adapted to receive power therefrom and carries a saw 47 upon its opposite end. A pivoted table 48 is mounted adjacent the saw 47 and is adapted to receive a block of wood therein for the purpose of retaining the same during the sawing operation. The construction of this table is well known and needs no further comment. A connecting rod 49 is secured to the gear 18 and has its opposite end pivoted to a lever 51, the lower extremity of which is keyed to a shaft 52 journaled as at 53 and 54 to the skids 5 and 6.

Upon this shaft 52 I also mount low speed and high speed power dogs, which low speed power dogs are indicated by the numerals 56 and 57. These are pivoted as at 58 and 59 to a walking beam 61, keyed to the shaft 52. A spring 62 is adapted to abut a nose formed upon each of the dogs 56 and 57 for the purpose of maintaining the same in contact with the power ratchet 63.

The construction just described is best shown in Figure 4.

Mounted upon the opposite end of the shaft 52 from the low speed power dogs 56 and 57 is a yoke 64 on the ends of which are pivoted high speed power dogs 66 and 67. These dogs are adapted to engage teeth of a ratchet 68 formed upon one end of the power drum 69. This drum is provided with a brake drum 71 against which a brake band 72 is adapted to contact. This brake band is operated through the medium of a crank rod 73 operated through the medium of a lever 74. A shaft journaled as at 76 and 77 supports the power drum and also the power ratchet 63. This power drum is provided with a similar clutch mechanism to that shown in Figure 3, which is operated through the medium of a lever 78.

At 79, I have shown a standard provided with a slot 81 in which a block 82 provided with a handle 83 is adapted to move. This block has secured thereto one end of a spring 84, the opposite end of which is connected to the dog 66, and an additional spring extends from the dog 66 to the dog 67, as shown in Figure 2. A dog 86 is adapted to contact the ratchet 68 for the purpose of preventing retrograde movement as will be later seen. A high speed cable 87 is wound about the drum 23 while a power cable 88 is wound about the drum 69.

The operation of my device is as follows:—

Assuming that the parts are in the position shown in Figures 1 and 2, the motor 12 is started with the result that power is delivered through the pulley 14 to the pulley 46 of the circular saw 47. This saw is merely incidental to my device and forms no part thereof. Power is also delivered from the motor 12 through the gear 16 to the gear 18. Power from the rotation of the gear 18 may be transmitted to the drum 23 by manipulating the lever 28 which will cause the clutch members 29 and 31 to engage each other thereby causing the cable 87 to be wound upon its drum. This is for high speed work such as the hauling of light material from one place to another.

When it is desired to do heavy hauling, the lever 28 is released so that the clutch within the drum 23 is disengaged and the power is then transmitted from the lever 51 to the dogs 56, 57, 66 and 67. Assuming that the cable 88 has been attached to the object to be moved, it is first necessary to take up the slack which is done by causing the dogs 66 and 67 to engage their ratchet 68 which is done by grasping the handle 82 and moving the same downwardly in the slot 81 with the result that the springs attached thereto will drop the dogs 66 and 67 into engagement with the ratchet, it being understood that during this time, the movement of the dogs 56 and 57 which is causing the rotation of the ratchet 63 is having no effect upon the drum. The handle 82 is now elevated which moves the dogs 66 and 67 out of engagement with the ratchet 68 while the dog 86 prevents retrograde movement of the drum 69. It is now desired to apply great power to the drum and this is done by manipulating the handle 78 so as to engage the clutch within the drum 69 which brings into operation power from the ratchet 63. As the arc through which the dogs 56 and 57 move is very small in comparison to the lever 51 the result is that great power is applied to the cable 88 while the arc upon which the dogs 66 and 67 move is greater, therefore a higher speed is obtained but at a sacrifice of power.

It will thus be seen that I have provided an arrangement of parts whereby I can accomplish slow speed or high speed hauling through a simple arrangement of parts, and one which may be operated by an unskilled laborer.

It is to be understood that the form of my invention herewith shown and described is to be taken as a preferred example of the same and that various changes relative to the shape, size and arrangement of parts may be resorted to without departing from the spirit of the invention or the scope of the subjoined claims.

Having thus described my invention, I claim:—

1. In a device of the character described, the combination with a suitable support, of a motor mounted on said support, a gear adapted to be rotated by said motor, a drum mounted adjacent said motor, a gear mounted in axial alignment with said drum and adapted to mesh with said first mentioned gear, a clutch formed between said second mentioned gear and said drum, a low speed power drum remotely located from said motor, a ratchet formed on one end of said drum, a ratchet formed at the opposite end of said drum and adapted to be connected thereto through the medium of a clutch, and reciprocating means operated by said motor and connected to the ratchets for the purpose of rotating said low speed power drum.

2. In a device of the character described, a suitable support, a power drum mounted on said support, a ratchet formed integral with one end of said drum, a ratchet positioned at the opposite end of said drum and adapted to be connected to said drum at will, a shaft parallel to said drum, a lever adapted to reciprocate said shaft, and dogs pivoted to said shaft and adapted to contact said ratchets for the purpose of rotating said drum.

3. In a device of the character described, a suitable support, a power drum mounted on said support, a ratchet formed integral with one end of said drum, a ratchet positioned at the opposite end of said drum and adapted to be connected to said drum at will, a shaft parallel to said drum, a lever adapted to reciprocate said shaft, a walking beam secured to said shaft, dogs pivoted to said walking beam, said dogs being adapted to engage said second mentioned ratchet, means for maintaining said dogs in contact with said ratchet, a yoke secured to the opposite end of said shaft, and dogs pivoted to the extremities of said yoke, said dogs being adapted to contact said first mentioned ratchet.

4. In a device of the character described, a suitable support, a power drum mounted on said support, a ratchet formed integral with one end of said drum, a ratchet positioned at the opposite end of said drum and adapted to be connected to said drum at will, a shaft parallel to said drum, a lever adapted to reciprocate said shaft, a walking beam secured to said shaft, dogs pivoted to said walking beam, said dogs being adapted to engage said second mentioned ratchet, means for maintaining said dogs in contact with said ratchet, a yoke secured to the opposite end of said shaft, dogs pivoted to the extremities of said yoke, said dogs being adapted to contact said first mentioned ratchet, and means for moving said second mentioned dogs into or out of engagement with their respective ratchet.

In testimony whereof I affix my signature.

CHARLES M. BONNEY.